Feb. 13, 1951 W. E. HENDRICKS 2,541,872
TWO SPEED DIRECT TRANSMISSION
Filed May 16, 1947 2 Sheets-Sheet 1
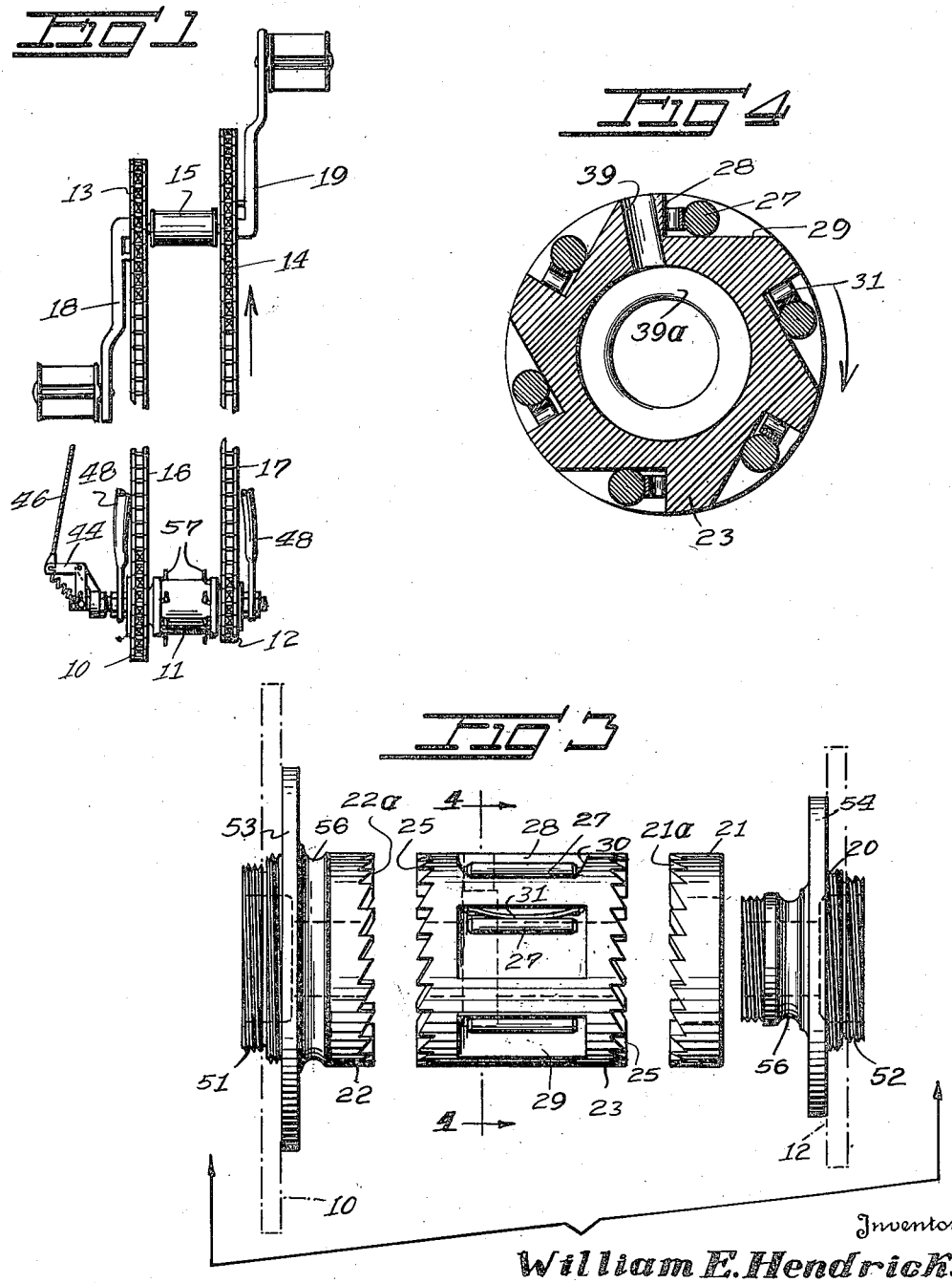
Inventor
William E. Hendricks
By Wilfred Lawson
Attorney

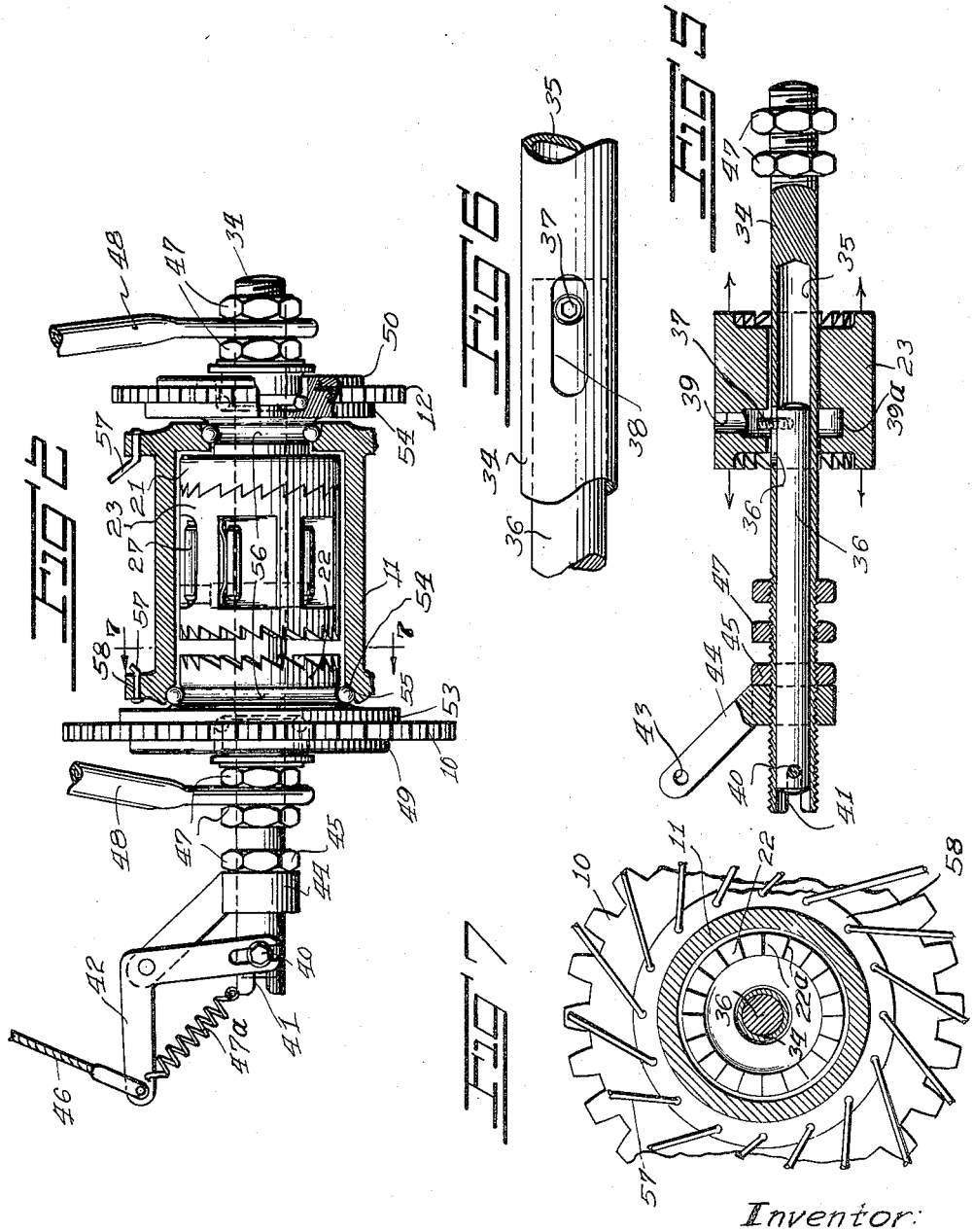

Patented Feb. 13, 1951

2,541,872

UNITED STATES PATENT OFFICE 2,541,872

TWO-SPEED DIRECT TRANSMISSION

William Earl Hendricks, Wichita, Kans.

Application May 16, 1947, Serial No. 748,498

1 Claim. (Cl. 192—48)

Heretofore attempts have been made to provide a two-speed gear-shift for bicycles, by means of a "de-railer" system, in which the drive chain was forced to jump from a large to a small gear sprocket, or by employing planetary gears in the rear hub, but none of these attempts have been successful or satisfactory.

In conventional single speed machines, compromising between high and low speed, an intermediary gear is then used so that speed is obtained by sacrifice of power for hill climbing, mud and windy weather, while on the other hand power is obtained by sacrifice of speed.

From these facts the conclusion will be drawn that two driving speeds are necessary, one for hills, mud, sand and high wind, and another speed for normal, level roads and cruising speed.

The main object of the present invention is now to provide an improved mechanism, which gives two direct drive gear ratios, which can be employed selectively by the rider, to meet any conceivable conditions. Also the relative high and low gear speed can be varied by simply changing the size of the sprocket and the length of the drive chain. This improvement is attained by means of a floating toothed clutch which constitutes the improvement and novel principle and employing two drive gears and chains.

Although this transmission is herein shown as applied to a bicycle, this does not limit the scope of my invention, as obviously the floating clutch principle may be applied to any mechanical construction where a two speed selective transmission is desired, for obtaining power from a drive gear to a rotary element as in motor cycles, power motors, autos, grinders, power drills, saws and so forth.

Some of the advantages of my bicycle construction and present day machines may here be noted.

By means of my floating clutch, free wheeling is possible both with high and low speed.

The floating clutch is simple in construction and is therefore an inexpensive, durable and trouble free transmission, permitting the rider to employ-selectively while traveling, a direct high or low gear and free wheeling.

No other bicycles possess this very desirable feature. A set of rollers constituting the sole bearings for the floating clutch while coasting, drives the bicycle by friction engagement against the inner surface of the hub shell or hanger actuated by springs. This is also a novel feature. The floating clutch is therefore at no time supported by or making direct contact with the rear wheel spindle.

One embodiment of the invention is herein described and illustrated in the attached drawing, wherein like numerals denote the same details in the different views.

Figure 1 represents in plan a view of my transmission as applied to a conventional "Morrow" bicycle hub;

Figure 2 shows the rear wheel hub assembly "Morrow" type, in partial section;

Figure 3 is an exploded view in elevation of the inner hub with floating clutch;

Figure 4 is a transverse section along line 4—4 of Figure 3;

Figure 5 is an axial section of the hub shaft proper; and

Figure 6 is a fragmentary plan view of Figure 5.

Figure 7 is a vertical section on plane along line 7—7 of Figure 2.

In the drawings numeral 10 denotes the left hand, low gear wheel sprocket for the rear wheel hub 11 and 12 is the right hand, high gear sprocket wheel for the same. The corresponding left and right hand sprocket wheels 13 and 14 for the front hanger 15 are connected by chains 16 and 17 to said rear sprockets, and numerals 18 and 19 are the left and right treadles for operating these sprocket wheels and chains.

The right hand high gear spindle consists of an outer and an inner portion 20 and 21, while the left hand, low gear spindle is numbered 22.

Between the right and left hand spindles is to be found a floating clutch drum 23, which is provided, at each end, with clutch teeth adapted for engagement with corresponding clutch teeth 21a and 22a respectively on the adjacent end faces of the spindles 21 and 22. The length of the drum 23 is such that it can take three positions, namely a middle for idling or free wheeling, when its clutch teeth 25 are completely out of engagement with the teeth 21a and 22a of the spindles; a second position for high speed, when its teeth 25 engage with teeth 21a on the high speed spindle 21; and a third position, with said teeth 25 in mesh with teeth 22 on the low-gear spindle 22.

The clutch drum 23, as seen in the cross section Figure 4, carries a set of friction rollers 27, six being shown, placed circumferentially spaced in wide pockets, each having a short radial rear wall 28 and a flat bottom 29 perpendicular thereto and running out thru the peripheral surface of the drum 23. These pockets have rounded side walls 30 to hold the rollers in position. Behind each roller 27 and the rear wall 28 is placed a flat spring 31 tending to push the roller out of the pocket.

The spindles 20, 21 and 22, together with the sprocket drum 23 are all assembled in axial alinement on a central axle or shaft 34, see Figures 5 and 6, the right end of which is solid but the left end hollow, having a deep axial counterbore 35. In the same is mounted to slide axially, an actuating rod 36 with a radial stud 37 threaded therein and projecting thru a longitudinal slot 38 into a radial hole 39 thru which the stud may be inserted in the rod 36, a circumferential groove 39a being provided for said stud.

The free end of the rod 36 is provided with key bolt 40 engaging in a slot 41 to prevent said rod from turning, but permitting axial sliding thereof. An elbow lever 42, pivoted at 43 on a bracket 44, is threaded on the end of the shaft 34 and secured by a jam nut 45. By means of a cord 46, operable from the handle bar of the bicycle, the lever 42 can be swung clockwise to draw the rod outwardly against the pull of a tension spring 47a and consequently will shift the drum to the left in Figure 5 into engagement with the left hand low speed spindle 22.

By means of other jam nuts 47 the shaft 34 is secured between the ends of the frame shanks 48, and larger jam nuts 49, 50, threaded at 51 and 52, hold the sprocket wheels 10 and 12 respectively flat against the large collar or flanges 53, 54 of the spindles 22 and 21.

The cylindrical casing or hanger 11 completely encloses the floating clutch drum 23 and the toothed ends of the gear spindles 21 and 22. Around the inner surface at each end of the hanger is provided an outer ball race 54 for the anti-friction bearing or balls 55, and similarly an inner ball race 56 is provided in each of the spindles 21 and 22.

The inner buttoned or threaded ends of the wheel spokes 57 are in the conventional manner secured in ears or flanges 58 provided at each end of the hanger 11.

From this detailed description of the construction of my bicycle, aided by the attached drawings, the operation thereof should be understood. However, it should be noted that normally the bicycle will run in high gear from the gear chain 17 and spindle 20, 21 while the low gear chain 16 and the spindle 22 are idling. This condition is caused by the tension spring 47 constantly pushing the rod 36 towards the right, as in Figures 2 and 5, thereby forcing the floating drum 23 with its teeth 25, in mesh with the clutch teeth 21a of the high gear spindle 20, 21. Upon the floating drum then spinning round its circumferential rollers 27 will be forced up the sloping bottom 29 to be wedged in against the inner surface of the hanger 11 causing the wheel rim to rotate with the same angular speed as the sprocket wheel 12.

In order to change from high to low gear speed, a pull on the cord 46 will retract the rod 34 with the drum 23, thus disengaging its clutch teeth 25, from the spindle 21, and throwing it in mesh with the teeth 22a of the low gear spindle.

For free wheel running the drum 23 is held by the cord 43 in the middle, free from both spindles 21 and 22.

It is to be understood that the invention as herein disclosed may be varied from the details described and shown without departure from the spirit of the subjoined claim.

I claim:

In a two speed transmission for bicycles and the like, including the drive wheel hub thereof, a sprocket supporting hub rotatably mounted in each end of the drive wheel hub, the sprocket on one of said supporting hubs being of a lesser diameter than that of the sprocket on the other supporting hub, a stationary axle extending through said supporting hubs, an annular clutch member mounted on each of said supporting hubs inwardly of the sprocket carried thereby, a drum rotatably and slidably supported on said axle between said annular clutch members, clutch elements carried at the opposite ends of said drum for selective cooperation with said clutch members, other clutch elements mounted in the periphery of said drum, springs cooperative with said other clutch elements to force the same into frictional contact with the inner periphery of said drive wheel hub, said axle having a bore opening through an end thereof and a slot outwardly of the side of the bore intermediate its ends, a rod slidable in said bore, a stud carried by said rod and projecting through said slot and into an annular groove formed in the bore of said drum, a bracket carried at the said end of said axle, a bell crank pivotally mounted on said bracket and to the outer end of said rod for actuation by the operator to shift the latter and said drum relatively to said axle and said annular clutch members, each of said supporting hubs having its opposite ends screw threaded, a flange encircling each of said supporting hubs between the threaded ends thereof, a sprocket wheel mounted on each of said supporting hubs at the outer sides of said flanges, an annular clamp plate engaged on each of said supporting hubs and abutted against the outer side of said sprocket wheels, and jam nuts on the outer threaded ends of said supporting hubs and tightened against said clamp plates, said annular clutch members being engaged on the inner threaded ends of said supporting hubs.

WILLIAM EARL HENDRICKS.

REFERENCES CITED

The following references are of record in the file of this patent:

UNITED STATES PATENTS

| Number | Name | Date |
| --- | --- | --- |
| 422,781 | Hiller | Mar. 4, 1890 |
| 1,145,378 | Lindsley | July 6, 1915 |
| 1,179,911 | Griffing | Apr. 18, 1916 |
| 1,611,108 | Doune | Dec. 14, 1926 |
| 2,162,646 | Shipman | June 13, 1939 |
| 2,222,695 | Velo | Nov. 26, 1940 |